United States Patent [19]

Gidge

[11] Patent Number: 5,450,716
[45] Date of Patent: Sep. 19, 1995

[54] BLUEBERRY HARVESTING MACHINE AND METHOD OF HARVESTING

[75] Inventor: Lester Gidge, Nashua, N.H.

[73] Assignee: Nashua Industrial Machine Corporation, Nashua, N.H.

[21] Appl. No.: 186,034

[22] Filed: Jan. 25, 1994

Related U.S. Application Data

[63] Continuation-in-part of Ser. No. 888,481, May 27, 1992, abandoned, which is a continuation of Ser. No. 159,330, Nov. 30, 1993, abandoned.

[51] Int. Cl.[6] .................. A01D 46/00; A01D 91/04
[52] U.S. Cl. ............................................ 56/330; 56/12.8
[58] Field of Search ....................... 56/34, 35, 127, 130, 56/330, DIG. 8, 12.8, 12.9

[56] References Cited

U.S. PATENT DOCUMENTS

| | | |
|---|---|---|
| 1,276,320 | 8/1918 | Borstad . |
| 1,283,526 | 11/1918 | Kaye . |
| 1,353,172 | 9/1920 | Mahtes ................................. 56/330 |
| 1,354,283 | 9/1920 | Clapp . |
| 1,362,285 | 12/1920 | Generouss ........................... 56/330 |
| 1,371,306 | 3/1921 | Hayden . |
| 1,572,025 | 2/1926 | Maglathlin ........................... 56/330 |
| 1,622,117 | 3/1927 | Jenkins . |
| 1,632,597 | 6/1927 | Hall ...................................... 56/330 |
| 1,784,702 | 12/1930 | Morano ................................ 56/330 |
| 2,445,162 | 7/1948 | Wallace ........................... 56/330 X |
| 2,459,471 | 1/1949 | Tebbetts ............................... 56/330 |
| 2,607,180 | 8/1952 | Stankavich et al. ................. 56/330 |
| 2,671,301 | 3/1954 | Harrison .............................. 56/330 |
| 2,732,677 | 1/1956 | Nielsen ................................. 56/330 |
| 2,783,605 | 3/1957 | Heleen ................................. 56/330 |
| 2,795,099 | 6/1957 | Getsinger ............................. 56/330 |
| 2,915,871 | 12/1959 | Furford ................................ 56/330 |
| 2,971,316 | 2/1961 | Popandopulo ....................... 56/208 |
| 3,460,332 | 8/1969 | Buchele ................................ 56/330 |
| 3,552,108 | 1/1971 | Kattan .................................. 56/330 |
| 3,590,566 | 7/1971 | Cutts .................................... 56/330 |
| 3,596,456 | 8/1971 | Quick ................................... 56/330 |
| 3,596,457 | 8/1971 | Van Tine ............................. 56/330 |
| 3,616,630 | 11/1971 | Gray .................................... 56/330 |
| 3,640,055 | 2/1972 | Looker ................................. 56/106 |
| 3,648,447 | 3/1972 | Burton ................................. 56/330 |
| 3,720,050 | 3/1973 | Rozinska .............................. 56/330 |
| 3,760,573 | 9/1973 | Porter ................................ 56/327.1 |
| 4,214,427 | 7/1980 | Bobard ................................. 56/330 |
| 4,790,127 | 12/1988 | Nason .................................. 56/330 |
| 5,134,837 | 8/1992 | Casey et al. ......................... 56/12.8 |

FOREIGN PATENT DOCUMENTS 1467562 3/1977 United Kingdom ................ 56/330

Primary Examiner—David J. Bagnell
Attorney, Agent, or Firm—Fitzpatrick, Cella, Harper & Scinto

[57] ABSTRACT

Apparatus and method for harvesting a crop, for example, blueberries. The apparatus includes a plurality of groups of channels arranged side-by-side to create a plurality of picking heads with stripping gaps. The picking heads are connected to a frame. As a motive force, such as a tractor, moves the frame through a field of plants, the ends of the channels are moved below the crop. The gaps between the channels strip the crop from the plants, and the crop falls into the channels, where the crop may move along the channels for collecting.

16 Claims, 12 Drawing Sheets

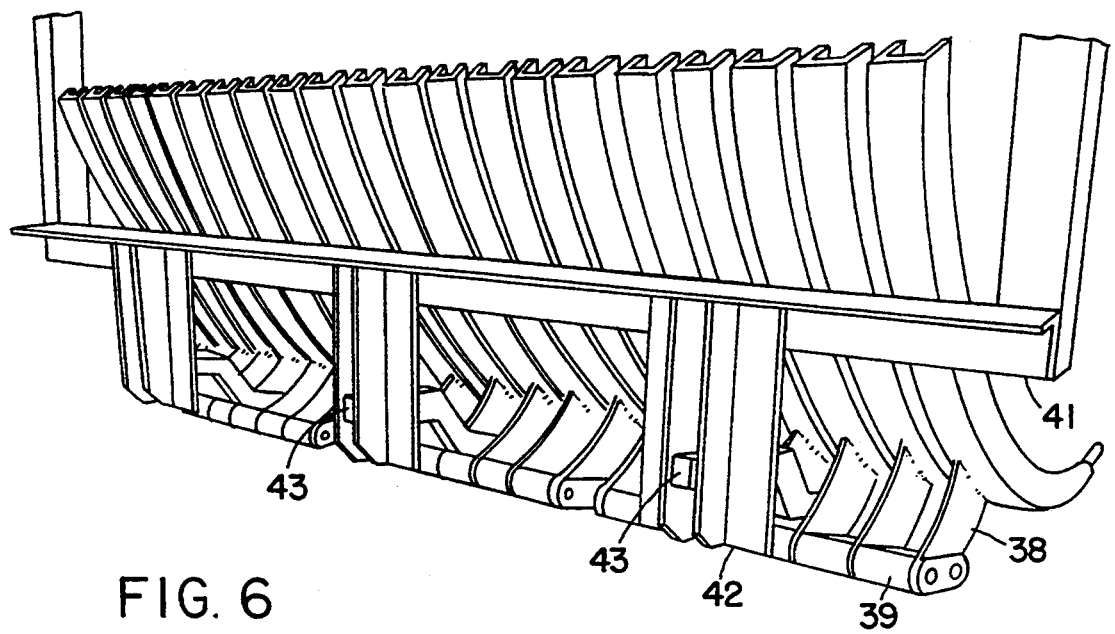
FIG. 4
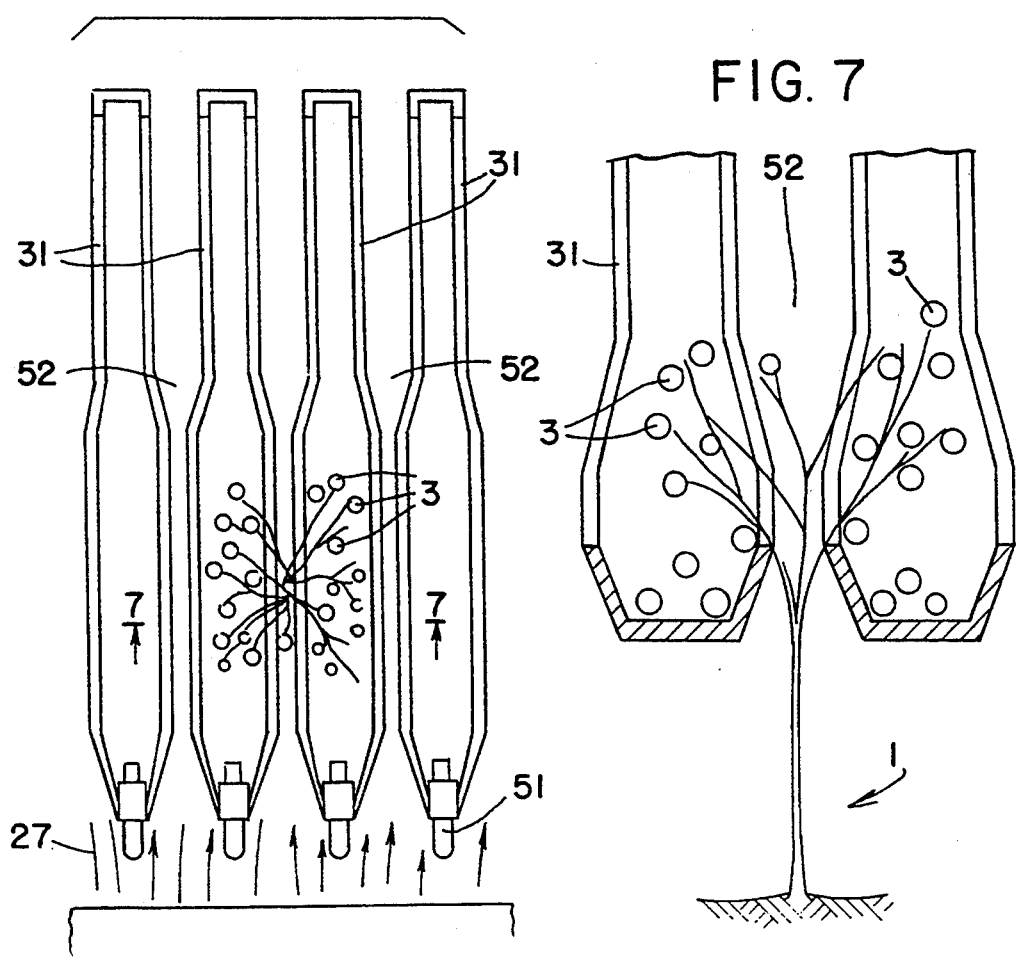
FIG. 6
FIG. 7

BLUEBERRY HARVESTING MACHINE AND METHOD OF HARVESTING

This is a continuation-in-part of my previous applications, Ser. No. 888,481, filed May 27, 1992, now abandoned, and its continuation Ser. No. 08/159,330, filed Nov. 30, 1993, now abandoned.

BACKGROUND OF THE INVENTION

The low-bush, wild blueberry is widely harvested in the United States. These plants, found in various locations in the United States, particularly Maine, grow in rocky, hilly terrain, which makes mechanization of their harvesting extremely difficult. This difficulty is compounded because these wild berries grow close to the ground in untilled and untillable fields, bearing their fruit about 3 to 12 inches above ground level, and when laden with berries or beaten down by rain, some of the plants may lie on the ground.

The deliciousness of the wild blueberry, however, has led to its being harvested and sold extensively in spite of these difficulties. Prior art methods for harvesting low-bush wild blueberries primarily include the use of hand rakes. These hand rakes typically have a short handle and a receptacle behind fine, flexible tines. The rakes are approximately 12 to 20 inches wide, with the tines spaced across the width. Each tine is solid, about $\frac{1}{8}$ inch in diameter and about 10 inches long, with about 3/16 inch between each pair of adjacent tines. A worker, stooping over the bushes, runs the rake through each bush area 2 or 3 times, combing the bushes and stripping off the berries. When the rake receptacle is full, the worker dumps its contents into a pail or box.

The use of these hand rakes has many drawbacks. Not only is the labor backbreaking and time-consuming, but it is wasteful. The need for more than one pass knocks some berries to the ground and they are lost, plus many blueberries are left behind on the bush. Consequently, 20% or more of each harvest is lost. Moreover, a very high percentage of debris, such as stems and other plant parts, is harvested along with the blueberry crop. This necessitates extensive winnowing steps later to prepare a product suitable for sale to consumers.

Attempts have been made to mechanize the harvesting of wild blueberries, but these have primarily involved the arrangement and movement of hand-type rakes in ferris wheel fashion to imitate the action of hand rakes. Such arrangements do not reduce many of the drawbacks mentioned with respect to hand rake harvesting, and some problems, such as damage to plants, are increased. Also, these prior art machines are particularly damaging to young plants that spread and grow in areas recently treated with herbicides. Also, these machines are unable to adjust to the hilly terrain in which the wild blueberry grows, and their complicated, moving parts are subject to damage in the obstacle-filled, stony fields in which they must operate.

SUMMARY OF THE INVENTION

This invention quickly and efficiently harvests wild blueberries from their low-growing bushes with minimum damage to the harvested blueberries and to the blueberry plants themselves. The invention also minimizes the amount of debris collected along with the blueberry crop.

The apparatus of this invention requires only a moderate level of skill to operate, can be adapted to several means of locomotion and widths as required by each grower's field conditions, and can be used on uneven ground, particularly in an embodiment with no rotating harvesting parts, without excessive damage to the machine, the berries or the crop plants.

While this machine has been developed to solve problems of harvesting wild blueberries, it may be adaptable to harvesting other berries and other fruit and vegetable crops, including for example blackberries, gooseberries, huckleberries and the like.

The harvesting machine of the present invention includes a mobile frame which supports a plurality of inclined channels. The channels form a picking head or picking unit for continuous horizontal movement through a field to be harvested. The channels are generally U-shaped in cross-section for receiving blueberries or other crop. The forward, lower ends or tips of the channels are held on or near ground level for continuous horizontal movement along the ground. The channels are arranged parallel and adjacent to each other, side-by-side in a row, forming a stripping gap between each pair of adjacent channels. Each picking head or unit extends across or perpendicular to the direction of movement of the machine through the crop. The gaps strip berries from plants and also allow passage of the machine over the plants without causing undue damage. The channels are shaped to catch the crop as it is stripped from the plants. A source of forced air directed into the channels near ground level may be used to move the stripped crop up the channels away from the ground. Alternatively, after a period of horizontal continuous movement along the ground, one group of channels may be raised up quickly while another group is put in their place. The raised-up group of channels may be designed to hold the berries that have fallen into the channels and transfer them to a receptacle such as a conveyor belt or basket.

The channels of this invention preferably have a bottom, two sides, which preferably slant inwards toward the bottom of the channel when viewed in cross-section, and a point at the lower end formed by an extension of the bottom surface. The sides are high enough to contain individual berries or other units of the crop. The height of the sides may be at least about 2 to 5 times the diameter of a unit of the crop or they may increase in height away from the point in order to hold more berries. The channel sides are about at least $\frac{1}{4}''$ to 11/2" high in the case of blueberries. The sides are far enough apart to permit individual berries to move along the channels without binding or clogging, about 3 to 10 times the width of each crop unit near the bottom of the channel, which means the channel is about 1 to 2 inches wide in the case of blueberries. The gap between adjacent channels is preferably about the width of a small unit of the crop, about 3/16" to $\frac{1}{4}''$ for blueberries.

The channels are strong and rigid, which makes them capable of penetrating through tangled masses of twigs, stems, runners and branches, and traveling beneath the crop. The channels may slide on or near the ground. The channels may be rigidly mounted, or they may be yieldingly or resiliently, mounted. The channels can resist, without substantial damage or substantial deflection, blows and wear they receive when driven against stones or other obstacles during use. The rigid, broad channels of this invention are able to penetrate varied densities of plants on hostile terrain while receiving only minimal damage, unlike the results suffered by the very narrow, flexible tines of the prior art blueberry hand rakes and their mechanized equivalents.

When the sides of the channels preferably slope slightly inwards towards the lower surface of the channel when viewed in cross-section, this taper reduces binding of plants between adjacent channels and provides more efficient stripping between adjacent channels.

The channels preferably vary in width somewhat along their length. They are narrow at their lower ends to ease entry of plants between them. They may be wider at the height where the fruit is drawn through the stripping gaps than they are above that point. This embodiment makes each gap narrower at this stripping height than it is above that height, and increases the stripping effect at the stripping height but reduces damage to plants and jamming of the machinery as the plants pass through the wider portions of the gap.

The channels at their forward ends may taper to point, and there may be an internal rim to reduce the tendency of crop units to roll forward and out of the channel.

Forced air may be used to move the stripped crop and any debris along the channels. If used, the forced air also tends to raise plants that may lie on the ground upward and into the gaps between adjacent channels. Forced air or other fluid may be delivered to the lower ends of the channels by means of flexible hoses, tubing, or other suitable air conveyance means. Each hose may terminate in an air nozzle whose outlet may be pointed at the bottom of each picking head. In one embodiment, there is one flexible hose and one air nozzle for each picking head.

The channels, which may be about 15 inches long, may be straight along the top and bottom, or they may curve slightly upward to increase stiffness and to provide for complete stripping to the top of the bushes in a shorter distance. The top and bottom may also diverge in rearward direction to increase the capacity of the channel to carry crop, particularly if combined with a holding area adjacent the rearward ends of the channels. The angle of the top edge, that comprises the stripping gap, to the ground is preferably about 15° and perhaps less, at least toward the forward end of the channels. If the channels curve upwardly from the ground and forced air is used, the curvature improves the scrubbing action of the air at the bottom of channels and promotes the efficient movement of berries and debris along the channels.

The channels are preferably attached to the harvester at their rearward ends. Berries may accumulate there for ease of transfer to a receptacle. In an alternate embodiment, the channels are attached to the harvester at their rearward facing or underneath surfaces, which provides an uninterrupted stripping gap from one end of the gap to the other. These attachments may then be connected to a bracket remote from the stripping gap, preferably at a distance and location such that the bracket does not interfere with the stripping action in the gap. An advantage of this arrangement is its avoidance of any three-sided blockage area at the rear of the gap where plants would have a tendency to jam. These attachments may be rigid or flexible and resilient. If flexible, resilient mountings are used, they may be made of flat, springy plates, one for each channel. Such attachments provide rigidity to each channel in the direction of motion of the channel through the field, but they permit side-to-side movement of channels relative to each other without interference with the passage of plants through the gaps, and these attachments permit the stripping gaps to enlarge to allow large objects to pass through the stripping gaps.

The harvesting machine may include a structure such as a shoe, a bar or a roller, which serves as a plant stabilizer. This plant stabilizer, located behind and beneath the channels, contacts or is near the ground and may support a portion of the weight of the channels. The stabilizers may be separate units, one for each channel, or they may extend parallel to and behind the picking head across the paths of one or more stripping gaps, located at a distance from the stripping gaps comparable to the height of the crop on the plants. A plant stabilizer thus bears on the base of plants while crop is being stripped from a plant and resists the stripping forces on the plant. This helps hold the plant in the ground during harvesting and reduces plant damage.

If flexible mountings are attached to the rearward surface of the channels, they may be attached to this plant stabilizer. In this case, the distance from the plant stabilizer bar to the flexible channel tip enables the forward tip portion of each channel to be more resilient. This resiliency permits the channels to move laterally with respect to each other in response to uneven terrain, varying plant density, rocks, etc.

The weight of a picking head may be partially supported by one or more of (a) the plant stabilizer, as already mentioned; (b) an adjustable support, such as an air or hydraulic piston; and (c) arm linkages which may be pivotably connected to a frame supported on wheels. Picking heads are preferably supported for easy movement upward and backward in response to obstructions such as rocks in the field.

Each picking head may be relatively narrow, about 12 inches wide, and several may be mounted side-by-side to make an efficient width machine. Approximately 5 to 10 channels may be used for each picking head, with seven channels being most preferred, and from 1 to approximately 10 picking heads per harvester. The width of the harvesting machine is preferably from about one to ten feet, depending on the number of picking units selected. Because the picking heads can be constructed separately, the harvesting machine can be built in a modular fashion and delivered to a grower in any width desired.

Whether using a single head or a plurality of picking heads mounted on one harvester, each head may be separately suspended from a frame. Thus, each picking head may be kept as light as possible and it may be readily movable independently of the frame, any motive force such as a tractor, or any other heads. The picking head may be supported to move independently, not only upwards and rearwardly, but also one side of each head may tilt up or down in response to obstructions, bumps or hillside terrain. The head, being individually suspended from the frame, articulates as it moves along while harvesting and hugs the ground.

An important aspect of this invention is therefore the ability of the harvesting machine to operate over irregular terrain without decreasing the yield of berries collected or causing unnecessary damage to the plants. To achieve those ends, the channels and picking heads may be resiliently attached to the rigid frame, as referred to above. Adjustable air pistons or similar devices may be used to counter-balance gravity and other forces, thus permitting the channels to float or contact the ground only lightly; i.e. the channels can move vertically in response to uneven terrain. The air pistons are adjustable to permit variations in the degree of springiness required in response to the terrain.

The present invention can, for example, be either pulled or pushed by a tractor or an all-terrain vehicle or may be self-propelled. As the harvesting machine travels forward, blueberry plants, which are about 3–12 inches high, pass through the stripping gaps. The forward motion of the machine, the constriction of the plants within the stripping gaps, and, if used, the force of air supplied by the blowers causes the fruit as well as some stems, leaves, twigs and other debris to be removed from the plants. This forced stream of air supplied by the air blower may be aimed up the channels to force the berries and other debris to ride up the length of curved, inclined channels on an air cushion and ultimately away from the harvester or into receptacles located directly behind the channels.

This invention reduces damage to the berries or other crop. As soon as the berries are freed from the plant they drop in to the channels. If forced air is used, they are immediately carried away and are not bruised by other berries, leaves or stems but are transported on an air cushion from the time they leave the plant until deposited in their receptacle. In such an embodiment, because of the lighter density of the debris, however, most of it is carried further than the berries and may be carried away from the harvester or directed into a separate receptacle for debris. The present invention may thus result in the collection of blueberries which are substantially free of debris in one step. While all the debris may not be removed in this way, the large volume of debris removed results in substantial savings in time and expense and may reduce or avoid later processing steps.

As will be apparent, the harvesting apparatus of this invention includes few or no rotary or reciprocating harvesting parts and no movement of any comb or rake intermittently in a circular, ferris wheel fashion, vertically while harvesting or repeatedly through the plants. The machine makes a single, generally continuous and horizontal pass through each portion of the field, on or at a relatively constant distance from ground level. While in some embodiments this continuous horizontal harvesting may be interspersed between quick removals by raising up of a group of channels for transfer of accumulated crop, the bottoms of channels remain generally continuously below the crop, and the crop falls into the channels. This simplicity has four basic advantages. The bushes are abused less, the machinery is tougher, the machinery is simple and hence less subject to damage, and a larger proportion of the crop is harvested.

BRIEF DESCRIPTION OF THE DRAWINGS

FIG. 4 is a detailed, rear view of the FIG. 1 picking heads.

FIGS. 6 and 7 are detailed views (FIG. 7 being taken from the section line 7—7 in FIG. 6) of the channels and stripping gaps formed by the channels in the embodiment of FIG. 1.

DETAILED DESCRIPTION OF PREFERRED EMBODIMENTS

Figure 1:
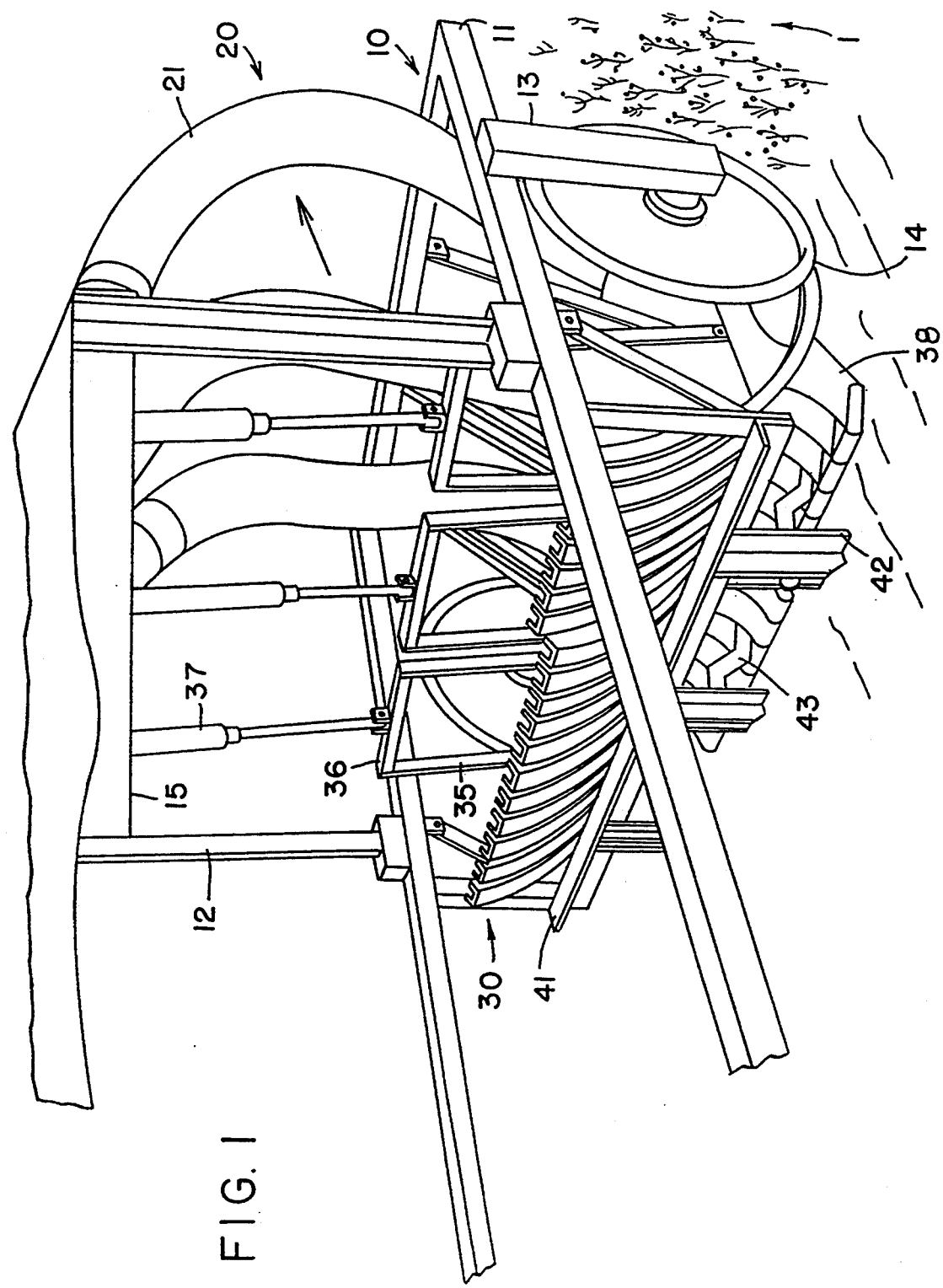
FIG. 1 shows a perspective view of a blueberry harvesting machine embodying the present invention.

In the embodiment shown in FIG. 1 a tractor pushes harvesting apparatus through a field of wild, low-bush blueberries 1 forward in the direction of the large arrow. The harvester includes a frame 10, which supports at the front a forced air assembly 20, followed by blueberry stripping assembly 30. The stripping assembly leads to collection areas for the berries and debris, which for clarity are omitted from FIG. 1 but are shown at 4 and 6 in FIG. 5.

As shown in FIG. 1 the frame 10 comprises two U-shaped components, one 11 in a horizontal plane and the other 12, mounted on top the first in a vertical plane. The horizontal portion of the frame has two downward-extending legs 13 which each support a wheel 14, on which the harvester is moved along the ground.

Figure 2:
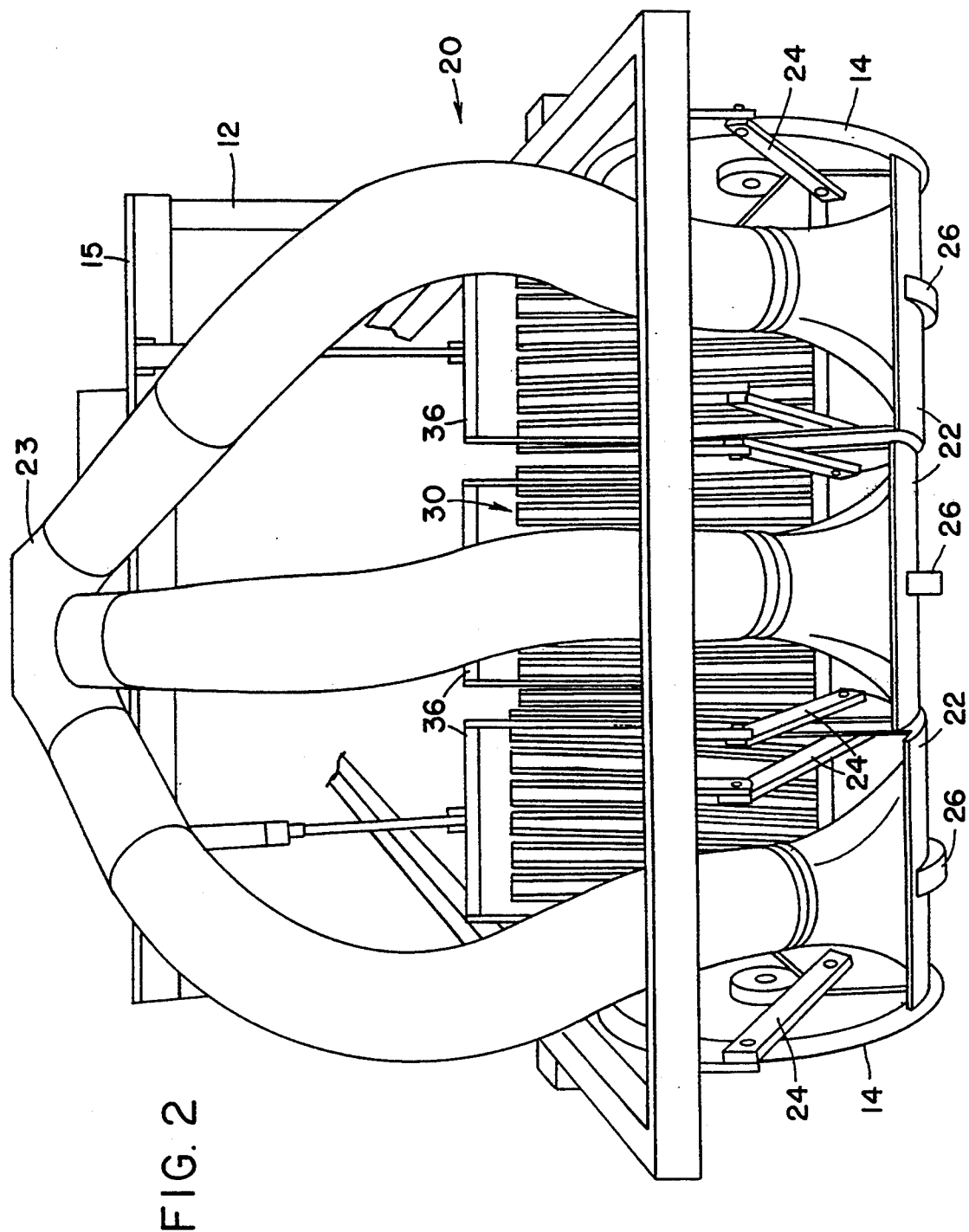
FIG. 2 shows a front view of the blueberry harvesting machine of embodiment of FIG. 1.

At the front of the harvester a forced air assembly 20 includes air hoses 21, arranged in parallel, which serve as conduits for forced air. Each conduit terminates in a respective nozzle 22, not visible in FIG. 1, but which can be seen in FIGS. 2 and 3. As shown in FIG. 2, in this embodiment the three air conduits 21 branch off from a single forced-air manifold 23, supported on vertical U-frame 12. Forced air is supplied from a forced-air source (not shown), which in this embodiment provides a pressure differential of six inches of water, through manifold 23 and conduits 21 to nozzles 22.

Figure 3:
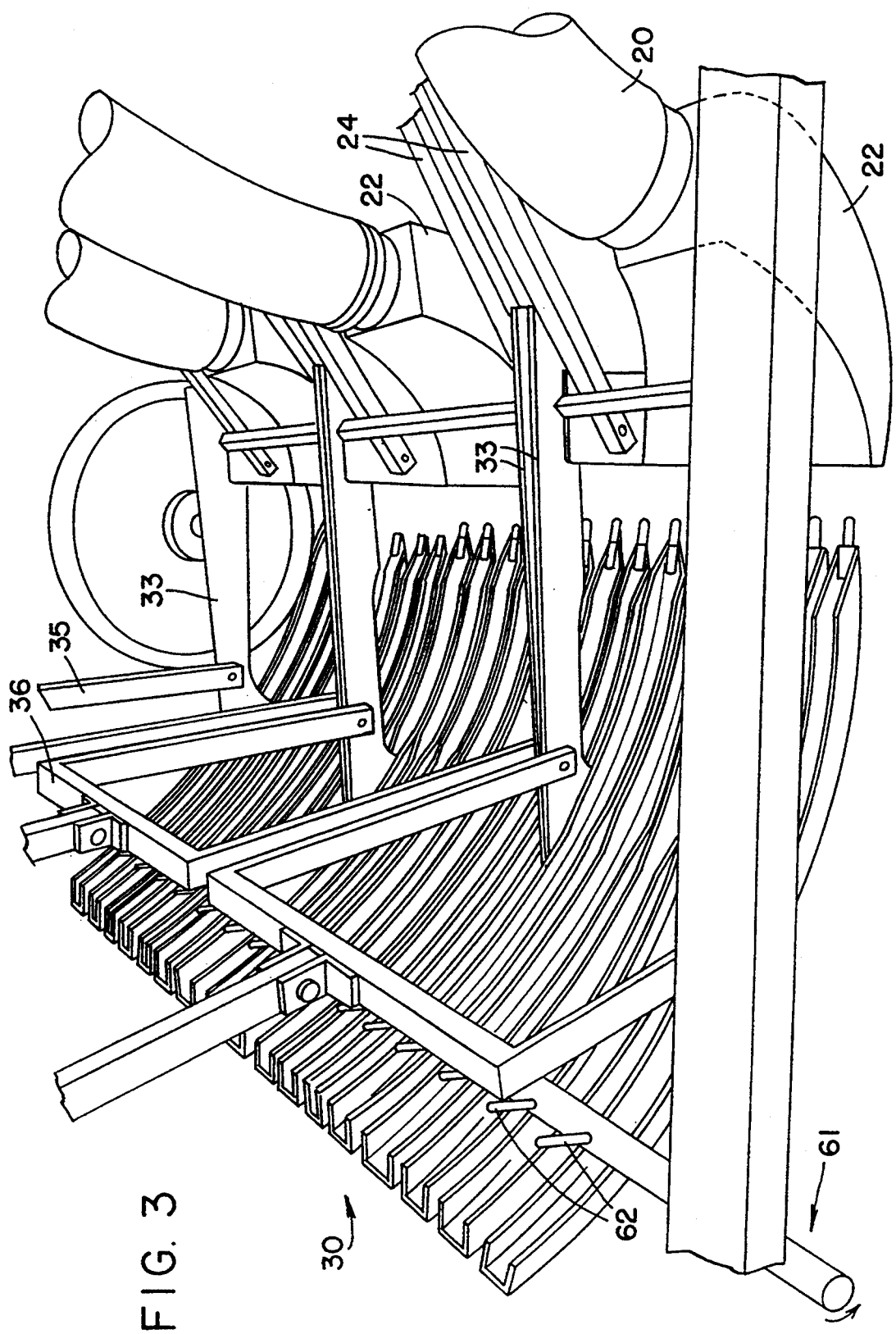
FIG. 3 is a detailed view of the FIG. 1 picking heads and air delivery system.
Figure 5:
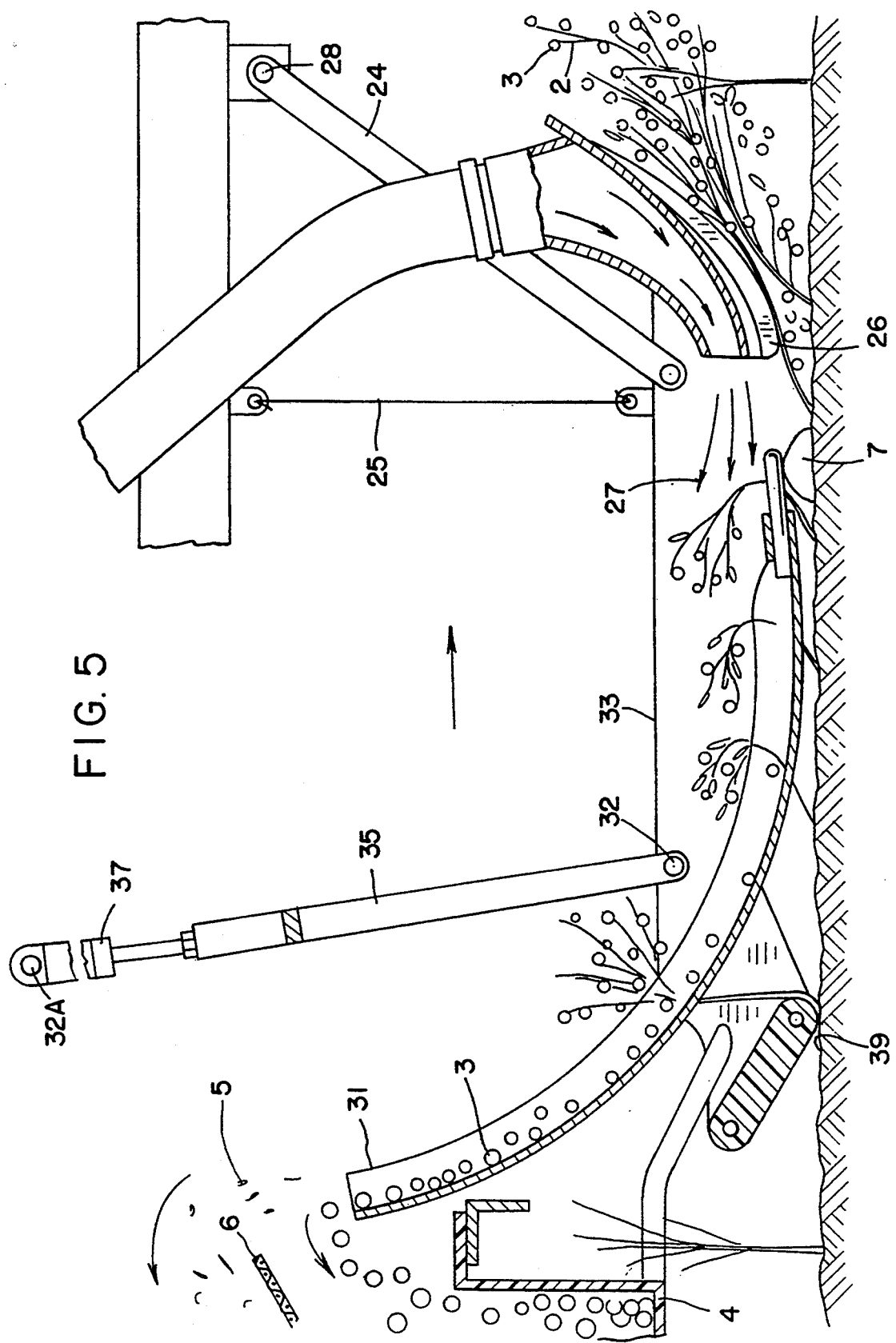
FIG. 5 is a detailed view, partly in section, showing the FIG. 1 blueberry harvester in operation.

As seen best in FIG. 3, each nozzle 22 is supported in part by two arms 24, one end of each of which is attached to one side of its nozzle assembly and the other end of which is attached to a respective short flange on the underside of the horizontal U-frame 11. The connections at each end of each arm 24 are each pivotable at pivots 28, as shown in FIG. 5. Each nozzle is also supported in part by a narrow skid 26, which helps the nozzle ride over obstructions, and by limit chains or cables 25 attached to arm 33, which tend to limit the downward travel of the nozzles.

Following the nozzles is a series of picking heads or stripping assemblies 30, each of which includes several upwardly inclined channels 31. The channels 31 are parallel and adjacent to each other, forming gaps 52 for stripping berries between adjacent channels. The channels are mounted for continuous movement on or slightly above the ground, and they curve upwardly from their ground level tips.

In this embodiment the mounting includes generally horizontal bars or arms 33 to connect each picking head pivotably to a respective nozzle assembly (see FIG. 3). The limit chains or cables 25 attached to arms 33 limit the downward travel of the picking heads, and their respective nozzles, to an approximately uniform level. Each head is also attached pivotably at pivots 32 to supporting arms 35 of a respective supporting, U-shaped bracket 36. The middle portion of the crosspiece of each bracket 36 is connected to one end of a respective air piston 37 whose other end is pivotably attached at pivot 32A to the cross-beam portion 15 of the upper U-frame 12, which is part of the rigid frame of the harvester. Air piston 37 can be used to lighten or adjust the force of the picking heads 30 on the ground.

Attached to the bottom, rearward surface of each channel 31 is a resilient flat spring plate 38. The lower end of the flat plate 38 attaches to a plant stabilizer 39, which may be a bar, a roller or the like. The stabilizer 39 extends laterally behind each picking head to form a unit which serves to hold the bases of the berry bushes and prevent or reduce uprooting.

The alignment of the plate 38 with the direction of movement of the channels through the field provides for rigidity and strength in the direction of motion, but the flexibility of the plate from side-to-side permits each channel to move from side-to-side, enlarging the gaps 52 as may be needed to permit passage of large stems or bundles. As shown best in FIG. 5, plate 38 is attached to a middle portion of channel 31 and is located underneath channel 31.

The plant stabilizer 39 is also underneath and below channel 31. Stabilizer 39 is extended in the direction of movement of the harvester and also upwardly from the ground in a direction generally parallel to the section of channel 31 to which plate 38 is attached. The connection of stabilizer 39 to plate 38 is also extended in that direction.

The extended connections of plate 38 to both plant stabilizer 39 and to channel 31 in the direction of motion of the harvester provide several advantages. These connections increase the strength and rigidity of channel 31 as it moves through the field. This arrangement also supports channels 31 without blocking or interrupting any portion of stripping gaps 52 and permits the gaps to be enlarged or narrowed along their entire lengths more easily than would be possible if adjacent channels were attached directly anywhere across the gap 52 at some point along or at the end of the channels. The placement of the connection between adjacent channels at a location remote from and to rear of the stripping gaps results in this connection avoiding interference with the stripping action, and the location is such that the stabilizer 39 holds the plants during stripping. As will be apparent, however, benefits of such mounting of the channels and rearward plates 32 underneath channels 31 can be achieved without mounting them on plant stabilizer 39. That is, in this embodiment plant stabilizer 39 serves two functions, (i) stabilization of plants while being stripped and (ii) provision of a mounting for the channels remote from gaps 52, but these two functions need not be combined in a single piece.

A rigid bar or cam 41, rigidly suspended from frame 11, limits the rearward movement of the of the picking heads 30 and prevents them from being dislodged from their positions in the event a substantial obstacle is encountered during harvesting, or if the harvester is operated at excessive speed. When heads 30 are pushed rearward into contact with cam 41, heads 30 may ride up cam 41 out of the way of the obstacle that forced them into contact with cam 41.

Pairs of closely spaced pairs of rear bars 42 are also provided, one pair centrally located behind each picking head 30. A bar 43 connected to the stabilizers 39 of each unit runs up through the gap between the pair of bars 42 and prevents excessive side-to-side movement of its respective picking head, while rearward movement and slight lifting of one side or the other is possible.

FIG. 3 is a detailed side view of the picking heads and the lower portion of the air delivery system. This also shows cleaning bar assembly 60, which includes a rotatable axle 61 and pins 62 which may extend into gaps 52 between channels 31. When required because of jams of twigs or other debris, the operator turns the axle 61 using a handle (not shown) to force the pins into gaps 52 and remove the debris.

FIG. 4 is a rear view of the channel arrangements, and shows the cam 41 which serves as a stop to limit the backward movement of the channels 31 while in operation, as well as the pair of closely spaced rear bars 42 provided for each picking head. It also shows plant stabilizers 39 as they each extend across, behind and underneath channels 31 of the respective picking heads 30, and it shows the resilient flat plates 38 extending between plant stabilizer 39 and a section of each channel 31 removed from the lower end of channel 31.

FIG. 5 is a detailed view, partly in cross-section, showing a preferred embodiment of the present invention in operation. Blueberry bushes 1, consisting of stems 2 and berries 3, pass under forced-air assemblies 20, which are partly supported by skids 26. The bushes, which may be blown rearward and upward by forced air 27, pass between channels 31, which move continuously along the ground, rising and falling to accommodate obstacles such as rock 7. The rising and falling is permitted by the linking arms 24, 33 and 35, and the weight of the picking head's nozzle is partially supported by adjustable air piston 37. The bushes 1 then pass into the stripping gaps between the channels. The berries 3 are stripped from bushes 1 and fall into channels 31. The plant stabilizer 39, attached to flat resilient plates 38, holds down berry plants 1 as they pass through the stripping gap between channels 31. The stripped berries 3 are transported up inclined channels 31, on a cushion of air supplied by air nozzles 22, to the upper end of channels 31 and, being denser than the debris, fall into a receptacle or bin 4. Lighter debris 5, such as twigs, stems and leaves, is carried further upwards on the air cushion falling away from and to the sides of the harvester, while heavier pieces of debris fall onto mesh screen 6.

FIG. 6, a detailed frontal view of four channels, shows crop plant 1 in stripping gap 52 between the adjacent, parallel channels 31 and berries 3 falling into the channels 31, and the generally parallel sidewalls, which in cross-section slope inwardly at the bottom to reduce construction except on the upper stripping edges of adjacent channels.

FIG. 7 shows the U-shaped cross-section of channels 31 and the sidewalls, which in cross-section slope inwardly at the bottom to reduce constriction between channels. The channels terminate at ground level in replaceable, wear-resistant, flexible channel tips 51. The tips are preferably cylindrical, about ½ inches in diameter and about three inches long, and made of polyurethane or other resilient material. Such a replaceable tip absorbs shock and reduces wear. Upon hitting a hard object, such as rock 7, the picking head moves upwards and backwards to clear that object, then swings back down to its former position.

The channels extend approximately 15 inches vertically above the ground and about 18 inches horizontally. They are curved about an approximate radius of 20 inches and are approximately 30 inches in length. Made of steel, they have a wall thickness of ⅛ inch, are about 1¼ inch wide at the bottom of the cross-section and taper outwardly to about 1½ inch wide. They may be about ¾ to 1½ inches deep.

The width of the channels, and consequently the width of the stripping gaps, vary along their lengths. Starting at the bottom end of the channel, after the very narrow flexible tip portion, the channel widens to approximately 1½ inches across at the lowest stripping level. At this point its stripping gap is about as wide as the smallest blueberry, about 3/16 inch. The channels remain at this width up to the top of the stripping height. The stripping height or stripping zone begins at approximately 1 inch off the ground and extends to about 12 inches above ground level. Thereafter, the width of the channels decreases to a width less than that in the stripping zone, and the gap widens. In this embodiment the stripping gap is narrowed to approximately 3/16 to ¼ inches at the stripping zone, and the gap widens at heights above the stripping zone to approximately ¾ to 1 inch to facilitate passage of the plants, tall weeds or saplings without clogging the stripping gaps and without ripping the plants out of the ground. Since the channels are continuously under the berry plant during harvesting, berries that fall are likely to be gathered and not lost.

The receptacle 4 used to capture and temporarily store the harvested fruit may be any receptacle recognized in the art, including buckets, baskets, boxes or conveyer means.

Thus, it can be seen that the individual channels 31 and the picking heads 30 are resiliently mounted on the frame in a way that permits the individual channels and picking heads to respond to terrain conditions, such as rock 7, and varying crop densities. Each picking unit can articulate and rotate some distance upward on its left or right edge in response to the terrain. The air piston 37 eases upward and downward movement of the picking units and the rear stabilizer cam 41 limits excessive backward movement and, in cooperation with the curved back surfaces of the channels 31, permits the head to ride upwards above obstacles. The channels are also capable of vertical and horizontal movement with respect to each other, but always at about the same uniform distance continuously on or slightly above ground level.

Figure 8:
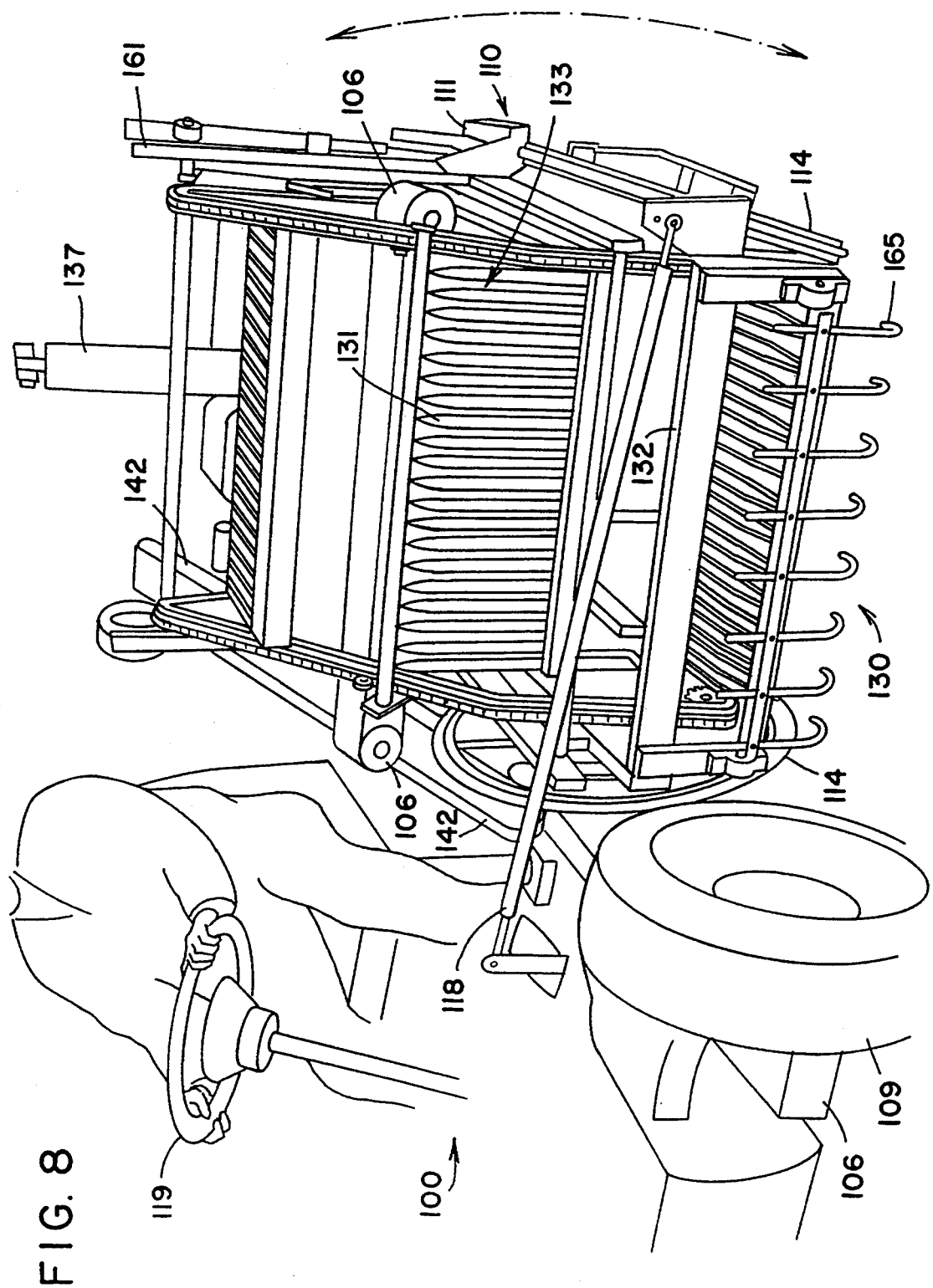
FIG. 8 shows in perspective a partial front view of a second blueberry harvesting machine of the present invention.

In the embodiment shown in FIG. 8 a motorized vehicle 100 supports and propels an outer harvesting frame 110. Outer harvesting frame 110 in turn supports a picking head 130, which includes cam track frame 132 and four picking buckets or groups 133 of a plurality of chutes or channels 131. The motorized vehicle 100 rides on three tires 109, one ahead and two behind (only one is shown in FIG. 8). The forward tire pivots and is steerable by steering wheel 119.

Figure 9:
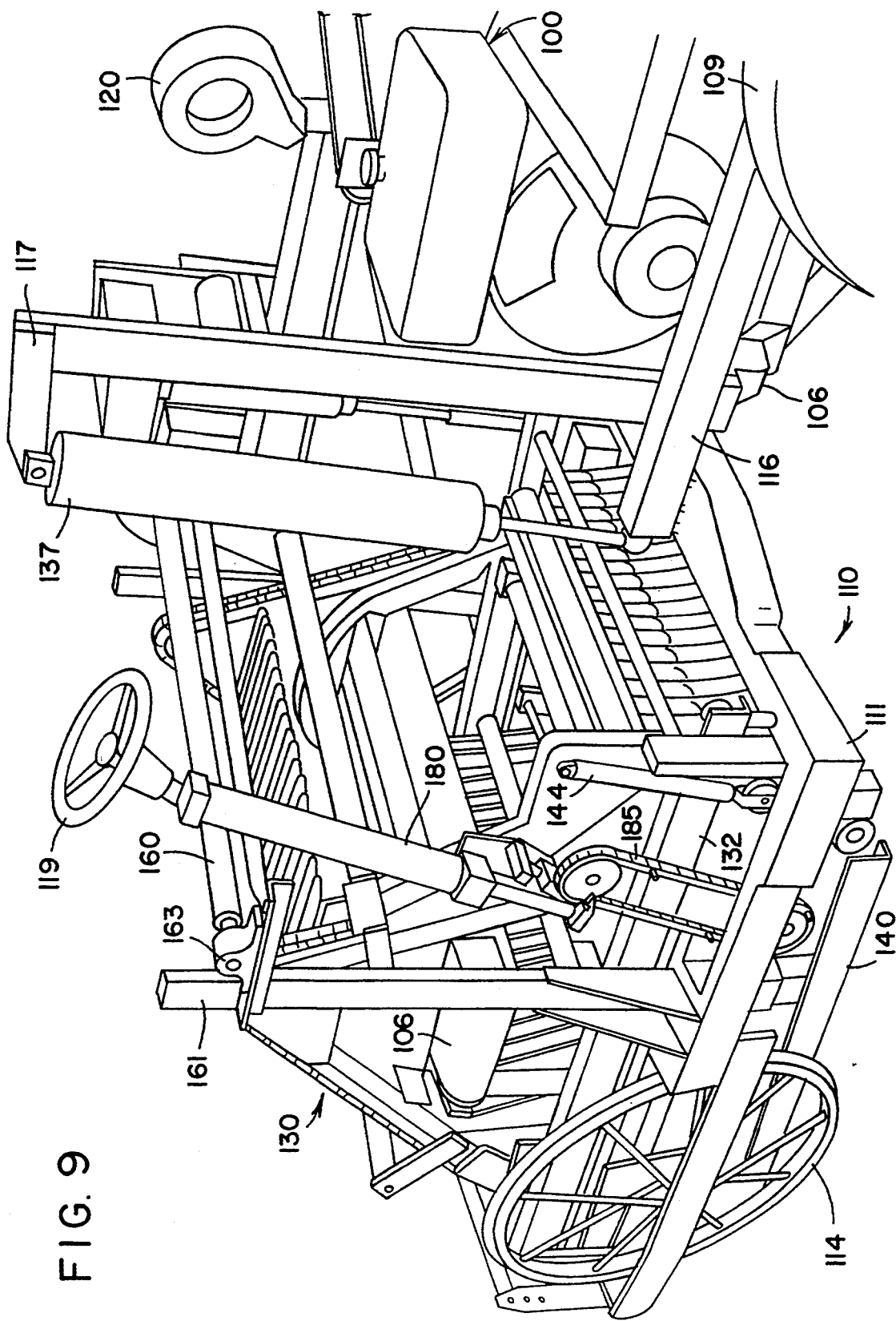
FIG. 9 shows a rear view of the FIG. 8 harvester.
Figure 10:
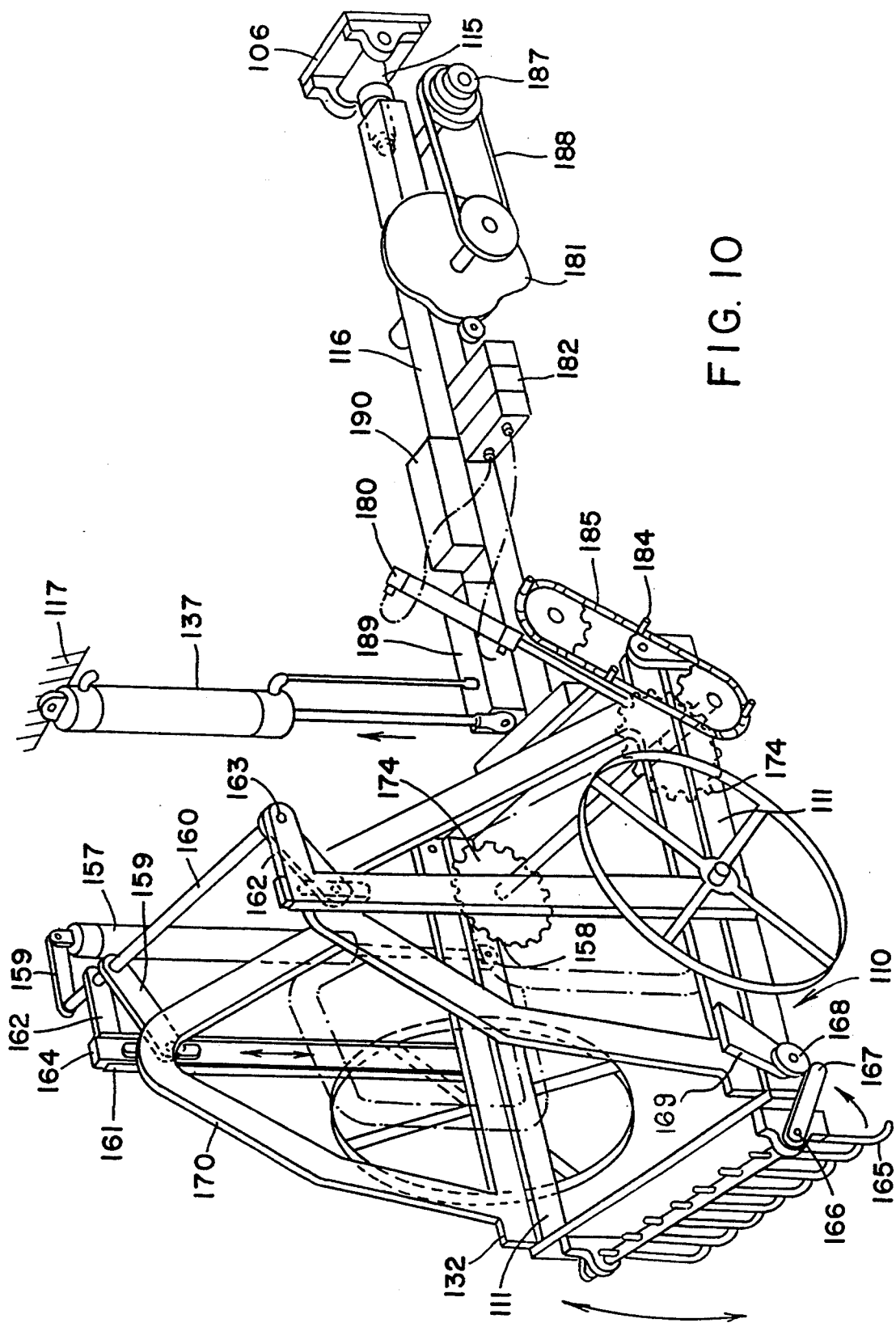
FIG. 10 shows frame and related portions of the FIG. 8 harvester.

Referring to FIGS. 8, 9 and 10, the outer harvesting frame 110 is supported by an air piston 137, by thin, large diameter wheels 114 and by arm 116, which is connected to vehicle frame 106 at universal joint 115. In this design the wheels 114 slant inwards under the picking head at about 15° to the vertical. In this way, they do not greatly disturb adjacent, unharvested berries.

Air piston 137, which acts as an air spring and for reduction of weight of unit 110 on wheels 114, is pivotally connected at its upper end to an arm 117, which is fixed to vehicle main frame 106, and its lower end is connected to a forward part of arm 116, which is connected to a U-shaped, horizontal frame piece 111.

This arrangement permits the weight on the wheels 114 to be lightened by increasing the upward force of piston 137. It also permits the outer harvester frame 110 to tilt from side to side, as shown by the arrow on the right side of FIG. 8, in response to uneven terrain. Also, as shown by the arrow in FIG. 10, the outer frame 110 can pivot up and down about the universal joint 115. The alignment of the outer frame 110 with the vehicle 100 is controlled by stabilizer arm 118, which is connected at one end to the outer frame 110 and at the other and to the vehicle 100.

Figure 11:
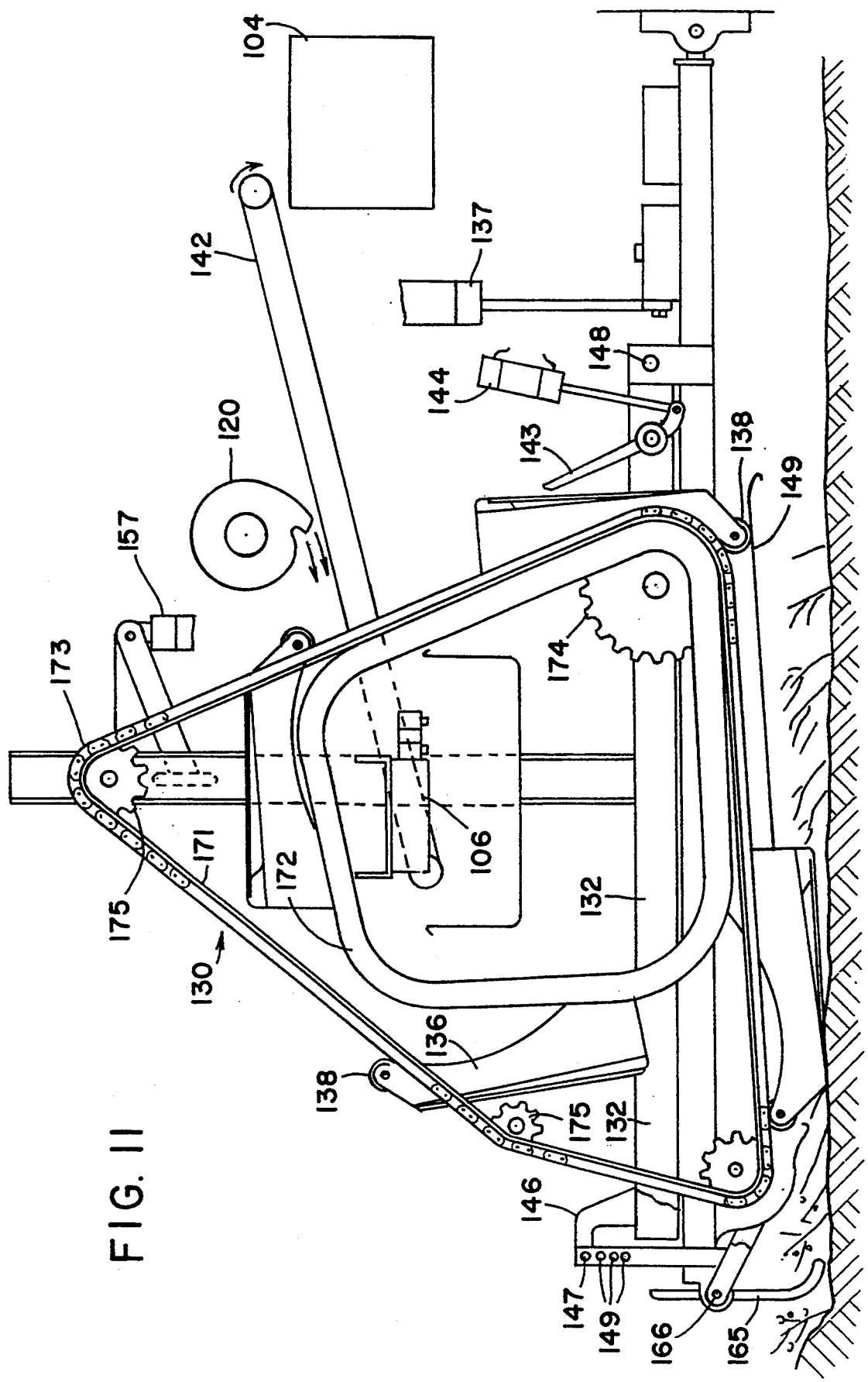
FIG. 11 is a side view of the FIG. 8 harvester.

The picking head 130 is movably supported and connected within outer frame 110 by adjustment arm 146, air piston 157 and pivot 148 (see FIG. 11). Pin 147, shown in FIG. 11, which may be inserted into one of several adjustment holes 149, provides an adjustable resting point for arm 146, which is attached to frame 132 of picking head 130. Air piston 157, which acts as a weight balance to reduce pressure of the head 130 on the ground, is connected at its lower end to a bracket 158 on outer harvester frame component 111. At its upper end piston 157 is connected to arm 159 which is linked to slide 164. Slide 164 is attached to the cam track frame 132. Slide 164 moves up and down within vertical guide 161, which is fixed to the U-shaped component 111 of picking head 130. Bar 160 is held by arms 162, which are fixed to vertical guide 161. Thus, a downward force by piston 157 on arm 159 tends to rotate bar 160 about pivot 163 and tends to support or raise picking head 130. The whole of the picking head 130 rotates about pivot 148, its rearward attachment between cam track frame 132 and outer frame 110.

The height of the forward end of the picking head may be raised by obstacle sensing fingers or bars 165. When these strike an obstacle such as a rock, they rotate about pivot 166, pushing arm 167 against wheel 168, which is mounted on arm 169. Because arm 169 is fixed to a portion of picking head 130, this tends to raise the picking head above the rock. By proper choice of the length of the bars 165 and the arm 167, one can raise the picking head 130 an amount equal to the amount the bar 165 rises, or one can raise the picking head a greater amount in a ratio of 1 to 2, for example.

As shown in FIG. 11, the picking head 130 includes an outer cam surface 171 and an inner cam track 172. A continuous chain 173, driven by sprockets 174 and carried by idler sprockets 175, rides on the surface 171.

Figure 13:
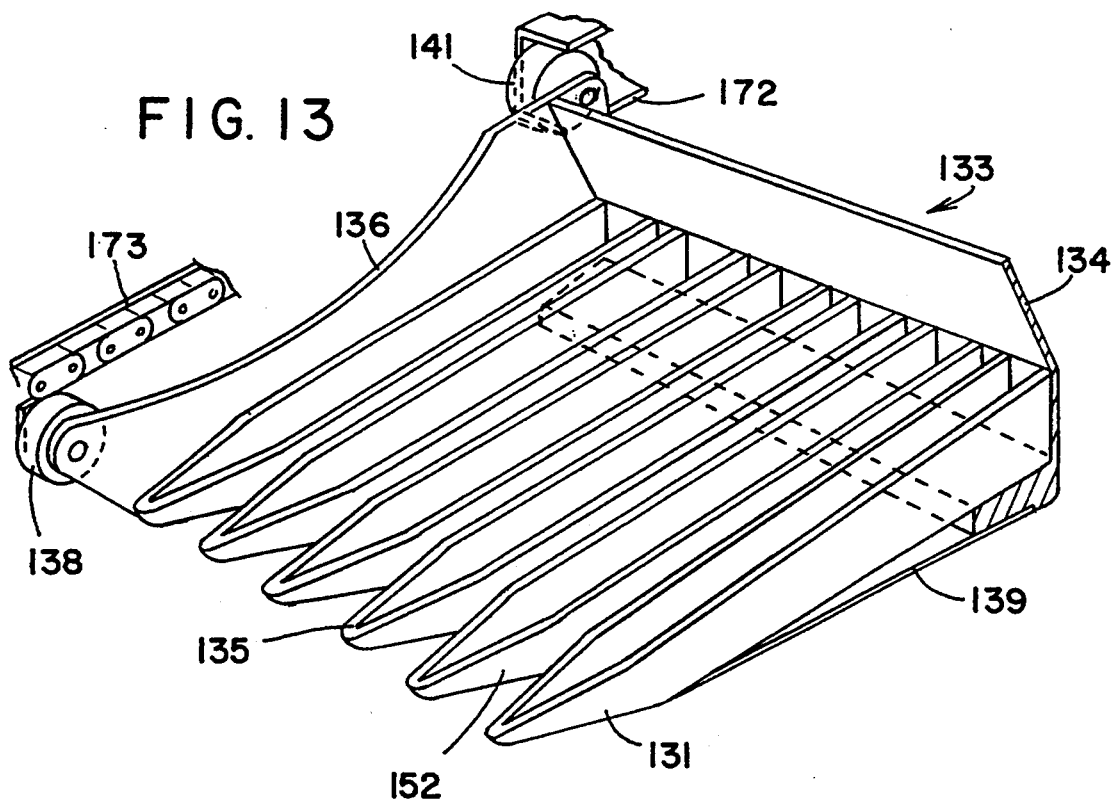
FIGS. 13, 14 and 15 show details of the FIG. 8 picking bucket assemblies.

Four picking bucket assemblies or groups 133 of channels 131 are carried by the chain 173 and the inner cam track 172. As shown in FIG. 13, each picking bucket assembly 133 is made up of a plurality of U-shaped channels 131 affixed at the rear to a backing plate 134. A preferred embodiment of channel 131, shown in FIGS. 13 to 15, has a flat base and planar sides of uniform thickness, the sides sloping outwards as they rise from the base to form a stripping gap 152 that is narrowest at the upper edge of the channel. Each channel 131 in this embodiment includes a shoe 139 which serves as a plant stabilizer, bearing against the base and roots of plants and reducing damage to plants as they are stripped of fruit in stripping gaps 152. In this embodiment, the shoe is welded near the front tip of the channel 131 and extends to the rear of channel 131. The lower, front tips of each channel may have an interior rim 135 which tends to hold berries in the channel. Each group of channels 133 has two side plates 136. The narrow end of the plates 136 is attached to chain 173 and a roller 138, which bears on the lower cam surface 149 (see FIG. 11). The wide end of each plate 136 is attached to roller 141, which rides inside inner cam track 172.

Figure 12:
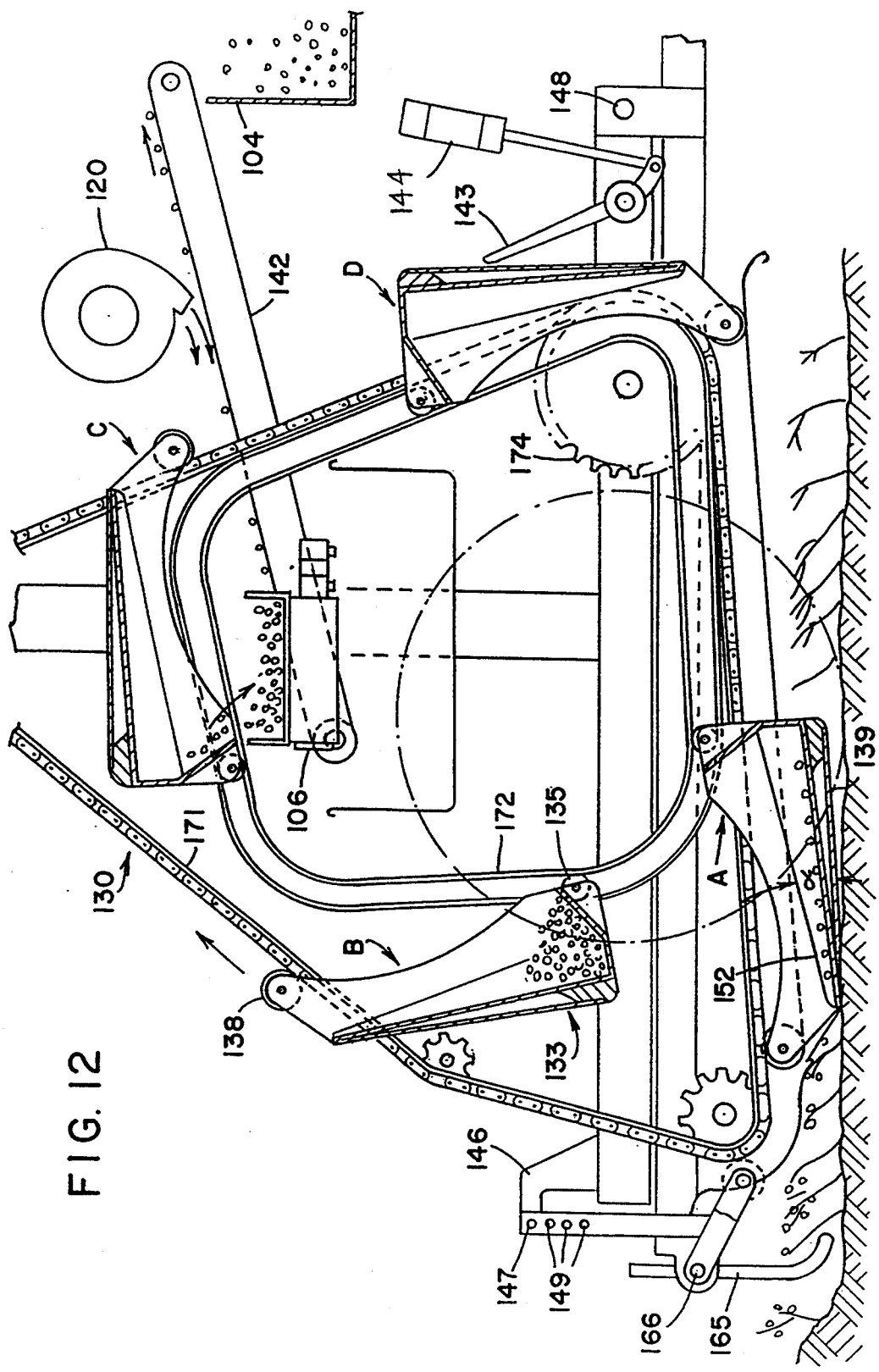
FIG. 12 is also a side view of the FIG. 8 harvester, but it is in partial section.
Figure 14:
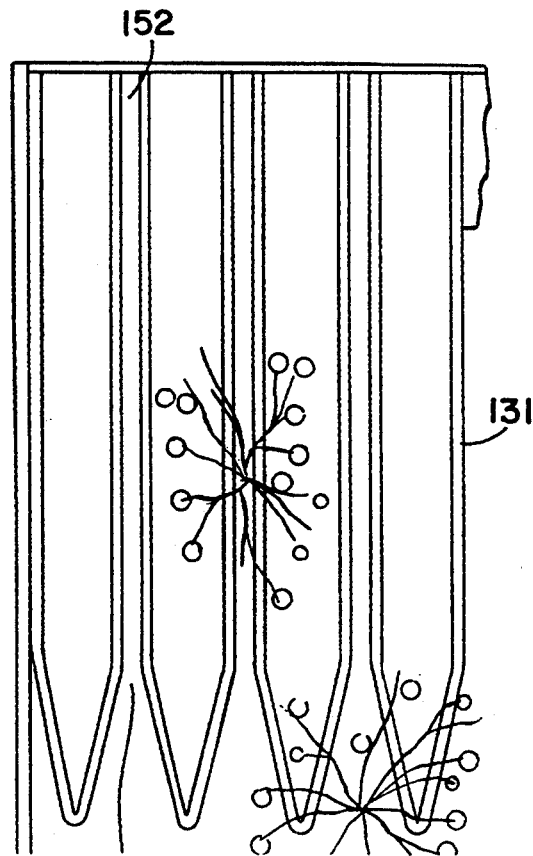
Figure 15:
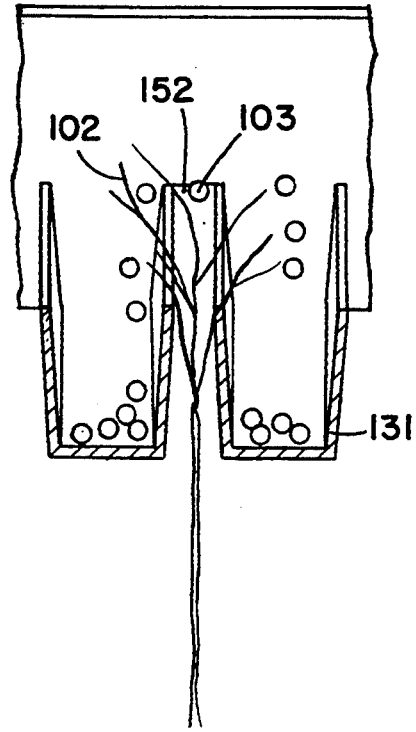

In operation, as shown in FIG. 12, there are four groups 133 of channels 131 in each picking head 130. These four ride in the positions shown in FIG. 12 for a period of time, and then they are rapidly indexed so that each group 133 replaces the one ahead of it. That is, the group at position (A) moves to position (B), (B) to (C), and so on. While a group of channels 133 is at position (A), it is carried horizontally along the ground by the movement of the vehicle 100 through a field of berries 101. As shown in FIGS. 12, 14 and 15, in this position (A), berries 103 are stripped from stems 102 in stripping gaps 152, formed by the convergence of the sides of adjacent channels 131. This convergence, which is caused by the outward slanting of the channel sides from channel bottom to channel top, reduces jamming in the stripping gaps 152 between adjacent channels. The berries fall into the channels 131 because they are riding close to the ground. The angle $\alpha$ between the stripping gap and the ground in side view is preferably only about 15° or less.

After a period of running horizontally, a substantial number of berries collect in the channels 131. The group of channels 133 is then rapidly indexed from position (A) to position (B), in a manner which will be described below. Because of the different paths of the chain 173 on the outer cam surface 171 and the inner cam track 172, in position (B) the picking bucket or group 133 tilts and the berries gather against the backing plate 134.

Also at each indexing, the group 133 at (B) moves to location (C), where the berries fall into a cross-wise hydraulic powered conveyor 106, which carries them to conveyor 142. From there they are carried rearward by hydraulically driven conveyor 142 to a receptacle or box 104. While on the conveyor 142, a forced air assembly 120 blows stems and other debris off the conveyor.

At each indexing, the group 133 of channels at (C) moves to position (D). In this location, cleaning knives 143, activated by piston 144 and rotating about pivot 145, move downward into stripping gaps 152 and remove stems and other debris that may be lodged there. The group 133 at (D) is then ready to move into the harvesting position (A) at the next indexing.

Figure 16:
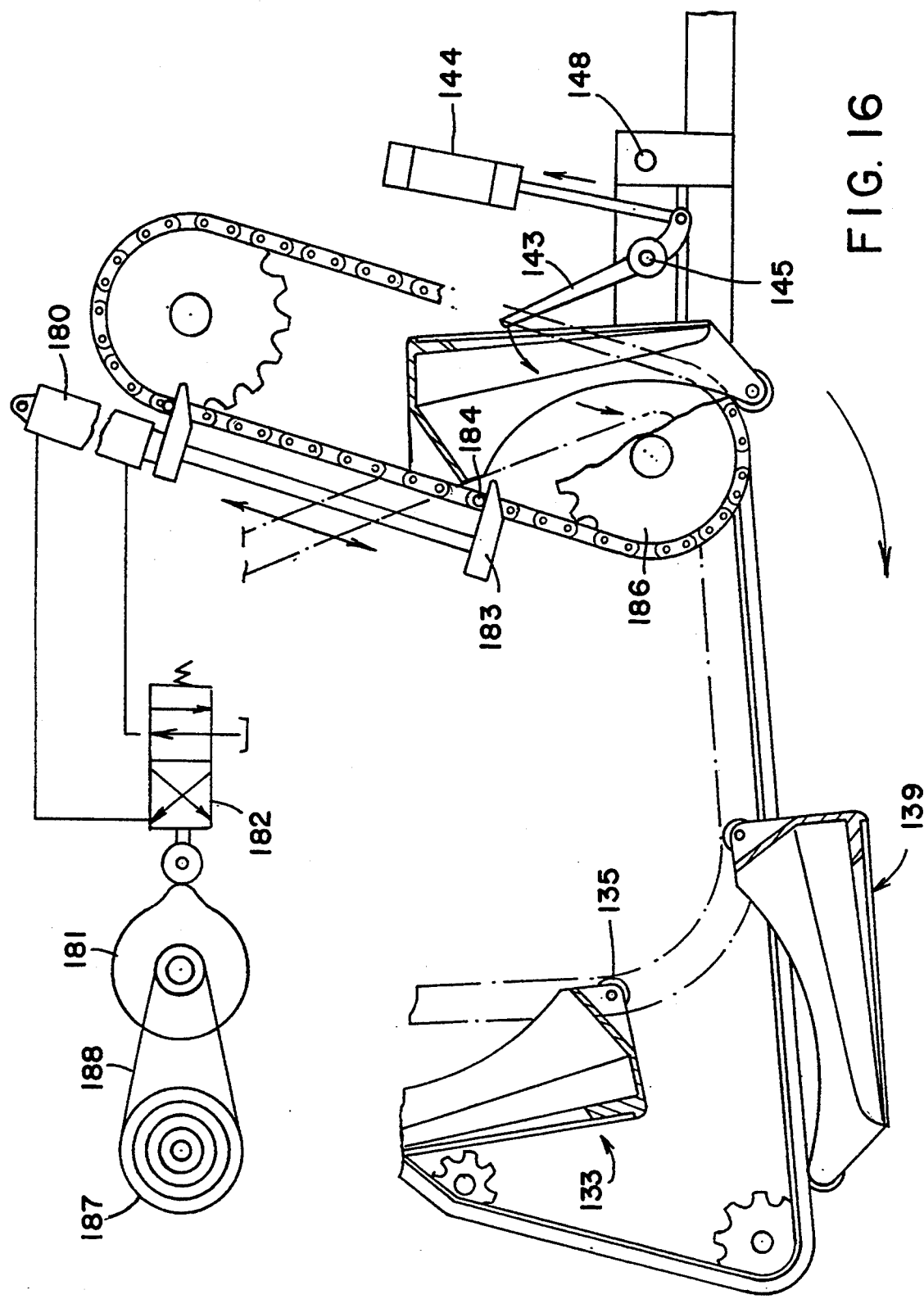
FIG. 16 shows the bucket indexing mechanism of the FIG. 8 harvester.

The indexing is accomplished, as shown best in FIG. 16, by a piston 180 which moves rapidly upwards in response to activation by cam 181 and control valves 182. Upon activation, piston 180 moves its arm rapidly upward and pawl 183 catches one of the lugs 184, which are spaced at intervals around chain 185. This turns driver sprocket 186, which is on the same axle as sprockets 174. This moves each group 133 of channels from one position to the next in a single rapid movement. The piston 180, under control of valves 182, then returns its pawl 183 to the initial lower position. Because the pawl 183 is built to pass over lugs when the pawl travels downward, the indexing mechanism is then ready for the next indexing. The frequency of indexing may be adjusted depending on the amount of fruit to be harvested and is determined by the rotating speed of cam 181, which in turn is controlled by pulley stack 187, driven by a constant speed source, in this case a power take-off (not shown) from the motor of vehicle 100. The speed of the cam is varied by placing the pulley belt 188 on different diameter pulleys.

The indexing is coordinated such that most of the harvesting is done while a group of channels is in position (A), moving parallel to the ground.

Air tank 189, at 60 psi, supplies air to air spring weight reduction piston 137. Air tank 190, also at 60 psi, supplies air to weight reduction air cylinder 157.

While the present invention has been described with reference to preferred embodiments thereof, many modifications and variations thereof will now be apparent to those skilled in the art. Accordingly, the scope of the invention is to not be limited by the details illustratively described herein, but is to be defined by the appended claims.

What is claimed is:

1. Apparatus for harvesting a crop comprising,
   a frame;
   a connector for connecting the frame to a motive force; and
   a plurality of groups of channels supported by the frame;
   each channel being rigid, generally U-shaped in cross-section and having a width between about 3 and 10 times the diameter of the units of the crop to be harvested;
   the channels being arranged in one or more of said groups such that the channels are side-by-side to form stripping gaps between them for stripping crop from plants that bear the crop;
   the one or more of such groups of channels being supported in an inclined position for movement of their lower ends horizontally near the ground while upper portions of the channels strip crop from the plants; and
   the channels and the stripping gaps being arranged such that crop units fall from the plants into the channels for movement of the crop units along the channels.

2. The apparatus of claim 1 in which the channels have sidewalls that extend upwardly and away from each other to form the stripping gap at their upper edges.

3. The apparatus of claim 1 in which the depth of the channels increases from the front of the channel to the back and the channels at their forward ends taper to a point with an internal rim to reduce the tendency of crop to roll forward and out of the channel.

4. The apparatus of claim 1 in which the angle between the stripping gap at the forward end of the channels and the ground is about 15° or less.

5. The apparatus of claim 1 further including uninterrupted stripping gaps and mountings which are attached to a rearward surface of respective channels without blockage at the rearward ends of the stripping gaps.

6. The apparatus of claim 1 where the crop is wild, low-bush blueberries.

7. Apparatus for harvesting a crop comprising;
   a frame; and
   a plurality of inclined channels supported by the frame;
   each channel being rigid, generally U-shaped in cross-section and having a width between about 3 and 10 times the diameter of the units of the crop to be harvested;

the channels being arranged in one or more groups side-by-side to form stripping gaps between them for stripping crop from plants that bear the crop;

the channels being supported for movement of their lower ends horizontally near the ground while upper portions of the channels strip crop from the plants; and the channels and the stripping gaps being arranged such that crop units fall from the plants into the channels for movement of the crop units along the channels, wherein (a) a group of the channels is mounted for movement independent of the frame to permit adjustment to uneven terrain and (b) the force required to move the group of channels upward in response to uneven terrain is adjustable.

8. The apparatus of claim 7 in which a group of the channels is supported for (a) horizontal movement near the ground for a period of time, (b) quick movement upwardly from the ground while containing crop that has fallen into the channels, and (c) transfer of crop from the channels into a receptacle for the crop.

9. The apparatus of claim 7 in which the frame is pivotably connected to a motive force, said pivot permitting the frame to move upwardly and to tilt from side to side, and the group of channels is movably suspended within the frame for adjustment in height above the ground independently of the height of the frame above the ground.

10. The apparatus of claim 9 in which the frame is supported at least in part by narrow, large-diameter wheels that ride on the ground.

11. The apparatus of claim 7 further including sensing fingers located ahead of the channels and arranged to detect uneven terrain, connection between the fingers and the channels, and a mechanism which raises the channels in response to the detection of uneven terrain by the fingers.

12. The apparatus of claim 7 further including a plant stabilizer behind the lower ends of the channels that applies pressure to and restrains bases of crop plants while tops of crop plants are in stripping gaps.

13. The apparatus of claim 7 in which channels are curved upwardly and the apparatus also comprises a nozzle to direct forced air into the channels near ground level.

14. A method for harvesting a crop from plants comprising, arranging a plurality of groups of channels, the channels in a plurality of the groups being in side-by-side relationship, to form a plurality of picking bucket, with stripping gaps between channels, the channels being rigid, generally U-shaped in cross-section and having a width between about 3 and 10 times greater than the diameter of a unit of the crop;

connecting the picking buckets to a motive force;

using the motive force to move one or more of the picking buckets through plants bearing a crop, the lower end of the channels moving horizontally near ground level during harvesting;

arranging the channels and the stripping gaps so that the stripping gaps strip crop from the plants while the lower ends of the channels move horizontally near the ground and crop units fall into the channels for moving along the channels.

15. The process of claim 14 including the steps of, utilizing a plurality of picking buckets arranged so that at least one picking bucket is in a first position for moving horizontally along the ground for a period of time and at least one picking bucket is not in such position; and rapidly indexing at least one picking bucket out of the first position and another into such position.

16. A picking head for attachment to a machine for harvesting berries from berry plants comprising;

structure for connecting the picking head and supporting the picking head on, a portion of a harvesting machine that may be moved by a motive force through a field of a crop to be harvested, and a series of parallel, adjacent chutes wherein the chutes, (a) are arranged side by side to provide stripping gaps between adjacent chutes for stripping the berries from plants; (b) are rigid, generally U-shaped in cross-section, and tapered at one end; and (c) have a width between about 3 and 10 times the diameter of a unit of the crop being harvesting and have side walls that extend upwardly and away from each other to form the stripping gap at their upper edges.

* * * * *

UNITED STATES PATENT AND TRADEMARK OFFICE
CERTIFICATE OF CORRECTION

PATENT NO. : 5,450,716

DATED : September 19, 1995

INVENTOR : LESTER GIDGE

It is certified that errors appear in the above-identified patent and that said Letters Patent is hereby corrected as shown below:

<u>COLUMN 5</u>

Line 21, "in to" should read --into--.

<u>COLUMN 7</u>

Line 61, "of the of the" should read --of the--.

<u>COLUMN 8</u>

Line 57, "construction" should read --constriction--.

<u>COLUMN 10</u>

Line 17, "and" should read --end--.

UNITED STATES PATENT AND TRADEMARK OFFICE
CERTIFICATE OF CORRECTION

PATENT NO. : 5,450,716

DATED : September 19, 1995

INVENTOR : LESTER GIDGE

It is certified that errors appear in the above-identified patent and that said Letters Patent is hereby corrected as shown below:

<u>COLUMN 14</u>

Line 8, "bucket," should read --buckets--; and

Line 33, "head" should read --head to,--.

Signed and Sealed this

Thirtieth Day of April, 1996

Attest:

BRUCE LEHMAN

Attesting Officer

Commissioner of Patents and Trademarks